US010776258B2

(12) United States Patent
Ward et al.

(10) Patent No.: US 10,776,258 B2
(45) Date of Patent: Sep. 15, 2020

(54) AVOIDING OUT-OF-SPACE CONDITIONS IN ASYNCHRONOUS DATA REPLICATION ENVIRONMENTS

(71) Applicant: International Business Machines Corporation, Armonk, NY (US)

(72) Inventors: Matthew J. Ward, Vail, AZ (US); Joshua J. Crawford, Tucson, AZ (US); Paul A. Jennas, II, Tucson, AZ (US); Jason L. Peipelman, Travis, TX (US); Gregory E. McBride, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/209,966

(22) Filed: Dec. 4, 2018

(65) Prior Publication Data

US 2020/0174919 A1 Jun. 4, 2020

(51) Int. Cl.

| | |
|---|---|
| ***G06F 12/02*** | (2006.01) |
| ***G06F 9/50*** | (2006.01) |
| ***G06F 3/06*** | (2006.01) |
| ***G06F 11/20*** | (2006.01) |

(52) U.S. Cl.

CPC ............ *G06F 12/023* (2013.01); *G06F 3/064* (2013.01); *G06F 3/065* (2013.01); *G06F 3/0619* (2013.01); *G06F 3/0689* (2013.01); *G06F 9/5016* (2013.01); *G06F 9/5022* (2013.01); *G06F 11/2074* (2013.01); *G06F 2209/5011* (2013.01)

(58) Field of Classification Search

CPC ...... G06F 3/065; G06F 3/0619; G06F 3/0689; G06F 3/064; G06F 12/023; G06F 9/5016; G06F 9/5022

USPC .......................................................... 711/162

See application file for complete search history.

(56) References Cited

U.S. PATENT DOCUMENTS

| | | | |
|---|---|---|---|
| 7,933,936 B2 | 4/2011 | Aggarwal et al. | |
| 8,024,442 B1 | 9/2011 | Roussos et al. | |
| 8,103,622 B1 | 1/2012 | Karinta | |
| 8,108,640 B1 | 1/2012 | Holl, II | |
| 9,767,111 B1 | 9/2017 | Natanzon | |
| 9,870,366 B1 | 1/2018 | Duan et al. | |
| 2014/0156956 A1* | 6/2014 | Ezra | G06F 3/065 711/162 |
| 2019/0339871 A1* | 11/2019 | Kucherov | G06F 11/1092 |

* cited by examiner

*Primary Examiner* — Hua J Song

(74) *Attorney, Agent, or Firm* — Nelson and Nelson; Daniel P. Nelson; Alexis V. Nelson

(57) ABSTRACT

A method is disclosed for avoiding out-of-space conditions in an asynchronous data replication environment. In one embodiment, such a method creates a consistency group on a primary storage system of an asynchronous data replication environment. The method determines a number of additional extents that will be needed on a secondary storage system to accommodate the consistency group. The number of additional extents is compared to a number of free extents on the secondary storage system. In the event the number of additional extents does not exceed the number of free extents, the method transfers the data from the primary storage system to the secondary storage system. In the event the number of additional extents exceeds the number of free extents, the method automatically takes actions on the secondary storage system to provide the number of additional extents. A corresponding system and computer program product are also disclosed.

20 Claims, 6 Drawing Sheets

600

Start

Consistency Group Ready for Mirroring? 602

N

Y

Query Secondary Storage System 604

Determine How Much Space will Be Needed on Secondary to Mirror Consistency Group 606

Analyze Results from Secondary Storage System 608

Needed Space Available? 610

N

Y

Mirror Consistency Group 612

Implement Policy 614

AVOIDING OUT-OF-SPACE CONDITIONS IN ASYNCHRONOUS DATA REPLICATION ENVIRONMENTS

BACKGROUND

Field of the Invention

This invention relates to systems and methods for avoiding out-of-space conditions in asynchronous data replication environments.

Background of the Invention

In asynchronous data replication environments such as z/OS Global Mirror (also referred to as "XRC") and Global Mirror, data is asynchronously mirrored from a primary storage system to a secondary storage system to maintain two consistent copies of the data. The primary and secondary storage systems may be located at different sites, perhaps hundreds or even thousands of miles away from one another. In the event an outage occurs at the primary storage system, host I/O may be redirected to the secondary storage system, thereby enabling continuous operations. When the outage is corrected or repaired at the primary storage system, host I/O may be redirected back to the primary storage system.

In Global Mirror environments, a journal volume may be used to harden consistency groups on a secondary storage system. An optional practice copy may also be created on the secondary storage system 104*b* to represent a specific consistent point-in-time. Frequently, in order to conserve storage capacity in Global Mirror environments, thin-provisioned volumes may be used for both journal and practice volumes on the secondary storage system. This is generally a good idea since storage space is allocated on an as-need basis. However, this technique has at least one significant drawback—it may result in an out-of-space condition on the secondary storage system, which may cause all data mirroring and writes to volumes to fail. The most common way to recover from such an event is to delete point-in-time-copy relationships (e.g., FlashCopy® relationships) on the secondary storage system, which causes all storage space associated with point-in-time-copy target volumes to be freed but also loses the last consistency group.

In view of the foregoing, what are needed are systems and methods to more effectively handle or prevent out-of-space conditions on secondary storage systems of asynchronous data replication environments. Further needed are systems and methods to establish actions and/or policies to be implemented in the event out-of-space conditions occur.

SUMMARY

The invention has been developed in response to the present state of the art and, in particular, in response to the problems and needs in the art that have not yet been fully solved by currently available systems and methods. Accordingly, the invention has been developed to provide systems and methods for avoiding out-of-space conditions in asynchronous data replication environments. The features and advantages of the invention will become more fully apparent from the following description and appended claims, or may be learned by practice of the invention as set forth hereinafter.

Consistent with the foregoing, a method for avoiding out-of-space conditions on a secondary storage system of an asynchronous data replication environment is disclosed. In one embodiment, such a method includes creating a consistency group on a primary storage system of an asynchronous data replication environment. The method further determines a number of additional extents that will be needed on a secondary storage system of the asynchronous data replication environment in order to transfer data associated with the consistency group from the primary storage system to the secondary storage system. The number of additional extents is compared to a number of free extents that are available on the secondary storage system. In the event the number of additional extents does not exceed the number of free extents, the method transfers the data from the primary storage system to the secondary storage system. In the event the number of additional extents exceeds the number of free extents, the method automatically takes actions on the secondary storage system to provide the number of additional extents thereon.

A corresponding computer program product and system are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
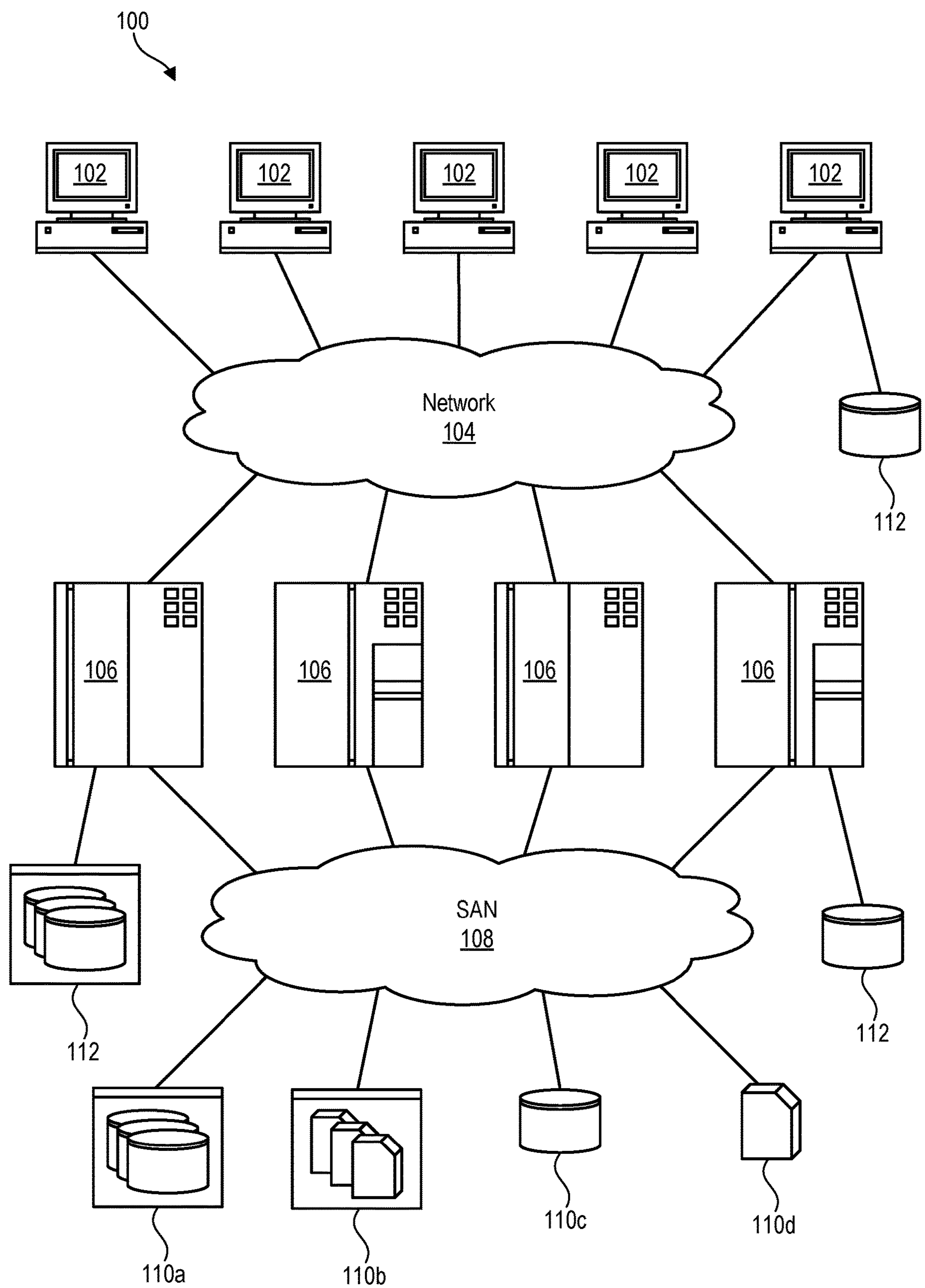
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer-implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where embodiments of the invention may operate. The network environment 100 is presented only by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers

106, such as a storage-area-network (SAN) 108 or a LAN 108 (e.g., when using network-attached storage). This network 108 may connect the servers 106 to one or more storage systems 110, such as arrays 110*a* of hard-disk drives or solid-state drives, tape libraries 110*b*, individual hard-disk drives 110*c* or solid-state drives 110*c*, tape drives 110*d*, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

Figure 2:
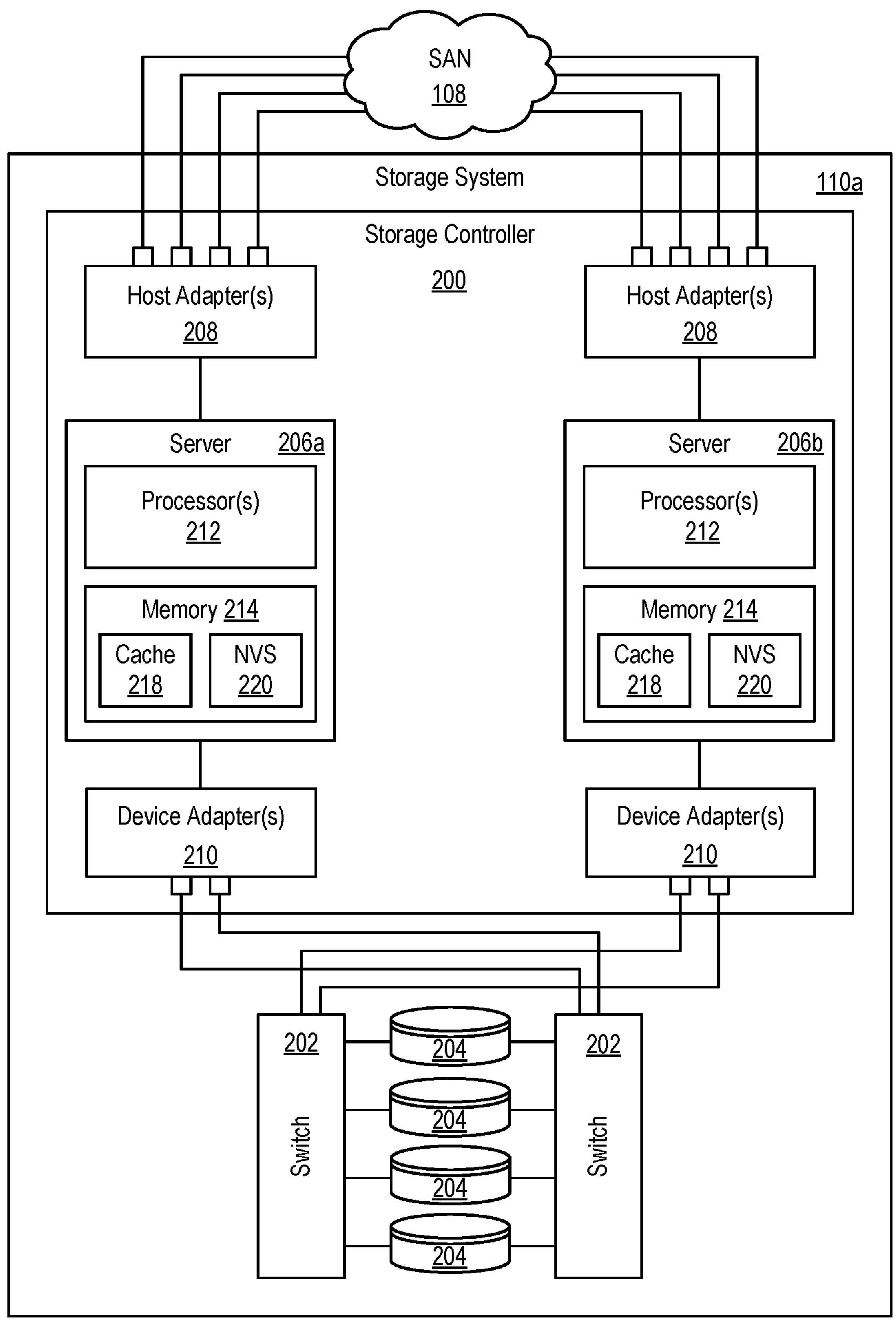
FIG. 2 is a high-level block diagram showing one example of a storage system for use in the network environment of FIG. 1.

Referring to FIG. 2, one embodiment of a storage system 110*a* containing an array of storage drives 204 (e.g., hard-disk drives and/or solid-state drives) is illustrated. The internal components of the storage system 110*a* are shown since the systems and methods disclosed herein may, in certain embodiments, be implemented within such a storage system 110*a*, although the systems and methods may also be applicable to other storage systems. As shown, the storage system 110*a* includes a storage controller 200, one or more switches 202, and one or more storage drives 204 such as hard disk drives and/or solid-state drives (such as flash-memory-based drives). The storage controller 200 may enable one or more hosts 106 (e.g., open system and/or mainframe servers 106) to access data in the one or more storage drives 204. The storage drives 204 may, in certain embodiments, be configured in RAID arrays of various RAID levels to provide desired levels of I/O performance and/or data redundancy.

In selected embodiments, the storage controller 200 includes one or more servers 206. The storage controller 200 may also include host adapters 208 and device adapters 210 to connect the storage controller 200 to host devices 106 and storage drives 204, respectively. During normal operation (when both servers 206 are operational), the servers 206 may manage I/O to different logical subsystems (LSSs) within the enterprise storage system 110*a*. For example, in certain configurations, a first server 206*a* may handle I/O to even LSSs, while a second server 206*b* may handle I/O to odd LSSs. These servers 206*a*, 206*b* may provide redundancy to ensure that data is always available to connected hosts 106. Thus, when one server 206*a* fails, the other server 206*b* may pick up the I/O load of the failed server 206*a* to ensure that I/O is able to continue between the hosts 106 and the storage drives 204. This process may be referred to as a "failover."

In selected embodiments, each server 206 include one or more processors 212 and memory 214. The memory 214 may include volatile memory (e.g., RAM) as well as non-volatile memory (e.g., ROM, EPROM, EEPROM, flash memory, local disk drives, local solid state drives etc.). The volatile and non-volatile memory may, in certain embodiments, store software modules that run on the processor(s) 212 and are used to access data in the storage drives 204. These software modules may manage all read and write requests to logical volumes in the storage drives 204.

In selected embodiments, the memory 214 includes a cache 218, such as a DRAM cache 218. Whenever a host 106 (e.g., an open system or mainframe server 106) performs a read operation, the server 206 that performs the read may fetch data from the storages drives 204 and save it in its cache 218 in the event it is required again. If the data is requested again by a host 106, the server 206 may fetch the data from the cache 218 instead of fetching it from the storage drives 204, saving both time and resources. Similarly, when a host 106 performs a write, the server 106 that receives the write request may store the write in its cache 218, and destage the write to the storage drives 204 at a later time. When a write is stored in cache 218, the write may also be stored in non-volatile storage (NVS) 220 of the opposite server 206 so that the write can be recovered by the opposite server 206 in the event the first server 206 fails.

One example of a storage system 110*a* having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the systems and methods disclosed herein are not limited to the IBM DS8000™ enterprise storage system, but may be implemented in any comparable or analogous storage system or group of storage systems, regardless of the manufacturer, product name, or components or component names associated with the system. Any storage system that could benefit from one or more embodiments of the invention is deemed to fall within the scope of the invention. Thus, the IBM DS8000™ is presented only by way of example and is not intended to be limiting.

Figure 3:
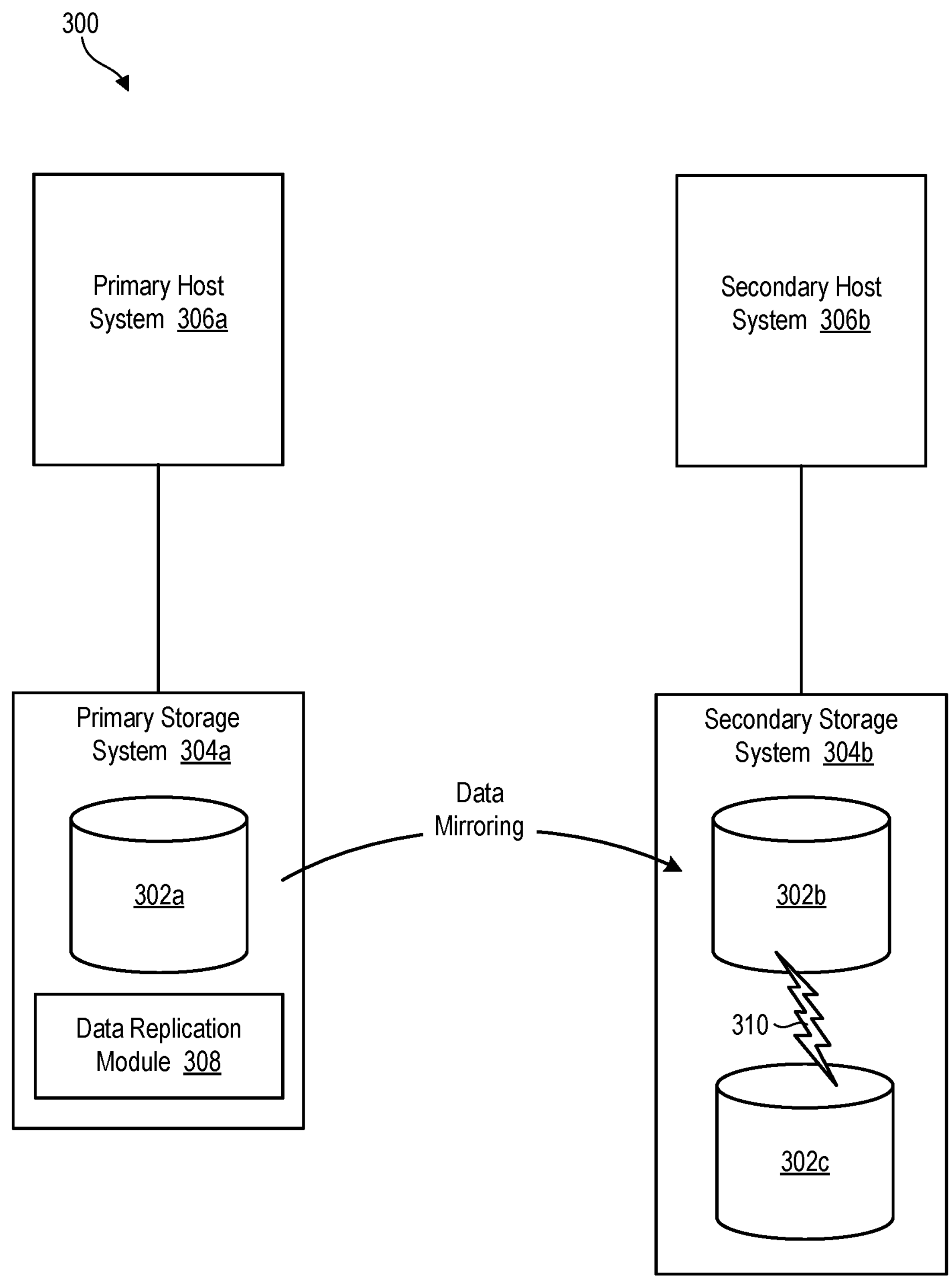
FIG. 3 is a high-level block diagram showing one example of an asynchronous data replication environment.

Referring to FIG. 3, as previously mentioned, in asynchronous data replication environments such as z/OS Global Mirror (also referred to hereinafter as "XRC") and Global Mirror, data is mirrored from a primary storage system 304*a* to a secondary storage system 304*b* to maintain two consistent copies of the data. The primary and secondary storage systems 304*a*, 304*b* may each be a storage system 110 such as that illustrated in FIG. 2. The primary and secondary storage systems 304*a*, 304*b* may be located at different sites, perhaps hundreds or even thousands of miles away from one another. In the event an outage occurs at the primary site, host I/O may be redirected to the secondary storage system 304*b*, thereby enabling continuous operations. When the outage is corrected or repaired at the primary site, host I/O may be redirected back to the primary storage system 304*a*.

FIG. 3 is a high-level block diagram showing an asynchronous data replication environment such as a Global Mirror environment. Using Global Mirror, functionality (referred to herein as a data replication module 308) within the primary storage system 304*a* may be used to directly mirror data from a primary volume 302*a*, located on the primary storage system 304*a*, to a secondary volume 302*b*, located on the secondary storage system 304*b*. At the secondary storage system 304*b*, a point-in-time copy function 310 such as FlashCopy may be used to periodically take snapshots of data in the secondary volume 302*b* and store the snapshots in a tertiary volume 302*c* (also called a journal volume 302*c*). In certain embodiments, the tertiary volume 302*c* is a thin-provisioned volume to save storage space.

Figure 4:
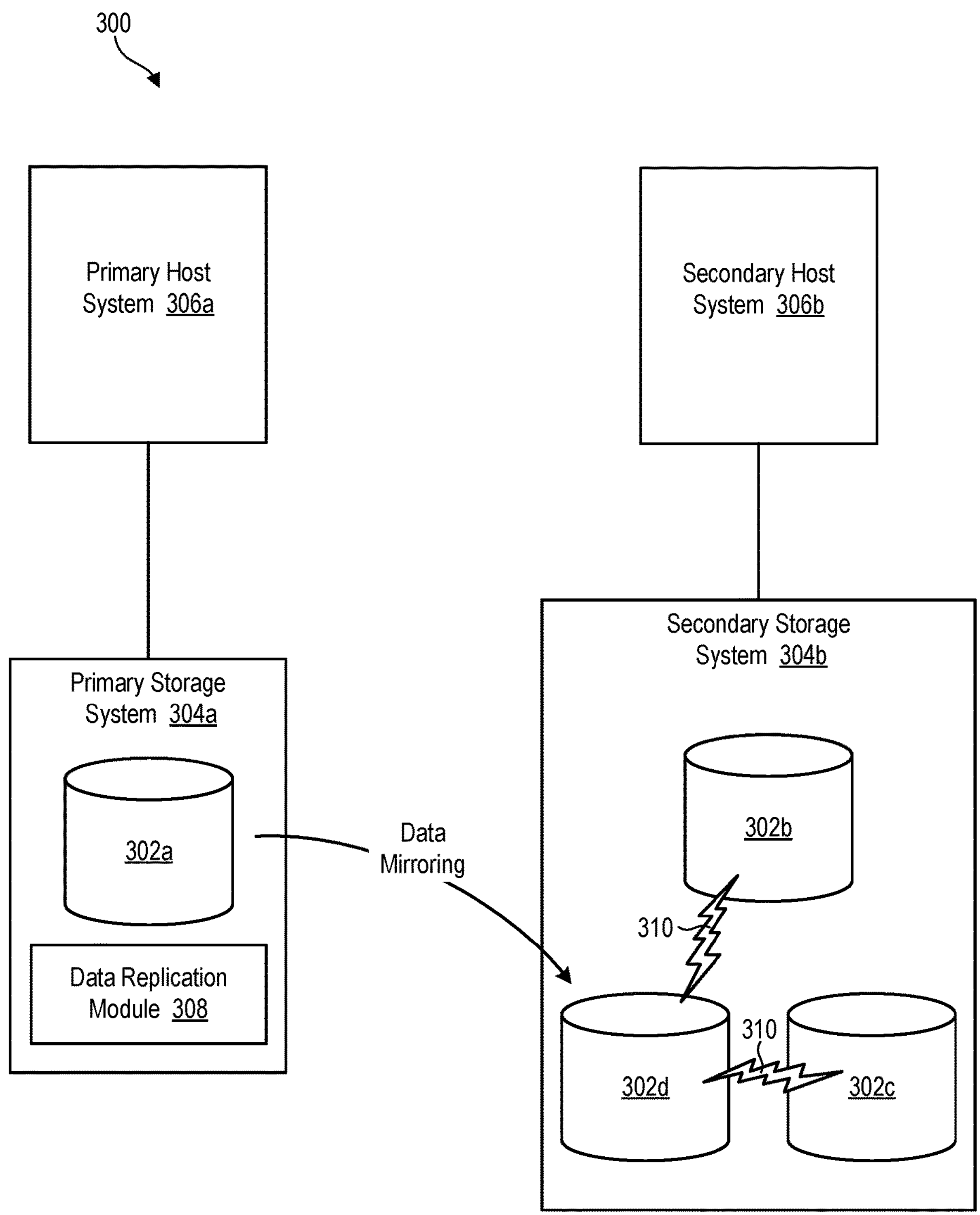
FIG. 4 is a high-level block diagram showing another example of an asynchronous data replication environment.

Referring to FIG. 4, in certain embodiments, a user may want a copy or snapshot of data at a secondary site on which the user can perform testing, such as disaster recovery or development testing. This copy will be referred to as a "practice copy" hereinafter. FIG. 4 is a high-level block diagram showing an asynchronous data replication system 300, such as Global Mirror, that uses a practice copy. As shown, functionality (referred to herein as a data replication module 308) within the primary storage system 304*a* may be used to directly mirror data from the primary volume 302*a* to an intermediate volume 302*d* within the secondary storage system 304*b*. A point-in-time copy function 310 such as FlashCopy may be used to periodically take snapshots of data in the intermediate volume 302*d* and store the snapshots in a tertiary volume 302*c* (also called a journal volume

302*c*), possibly on the same secondary storage system 304*b* as the secondary volume 302*b*. The point-in-time copy feature 402 may also be used to periodically, or at the prompting of a user, take a snapshot of data in the intermediate volume 302*d* and store it in the secondary volume 302*b*. This data snapshot may be used as a practice copy for testing and/or development purposes.

Figure 5:
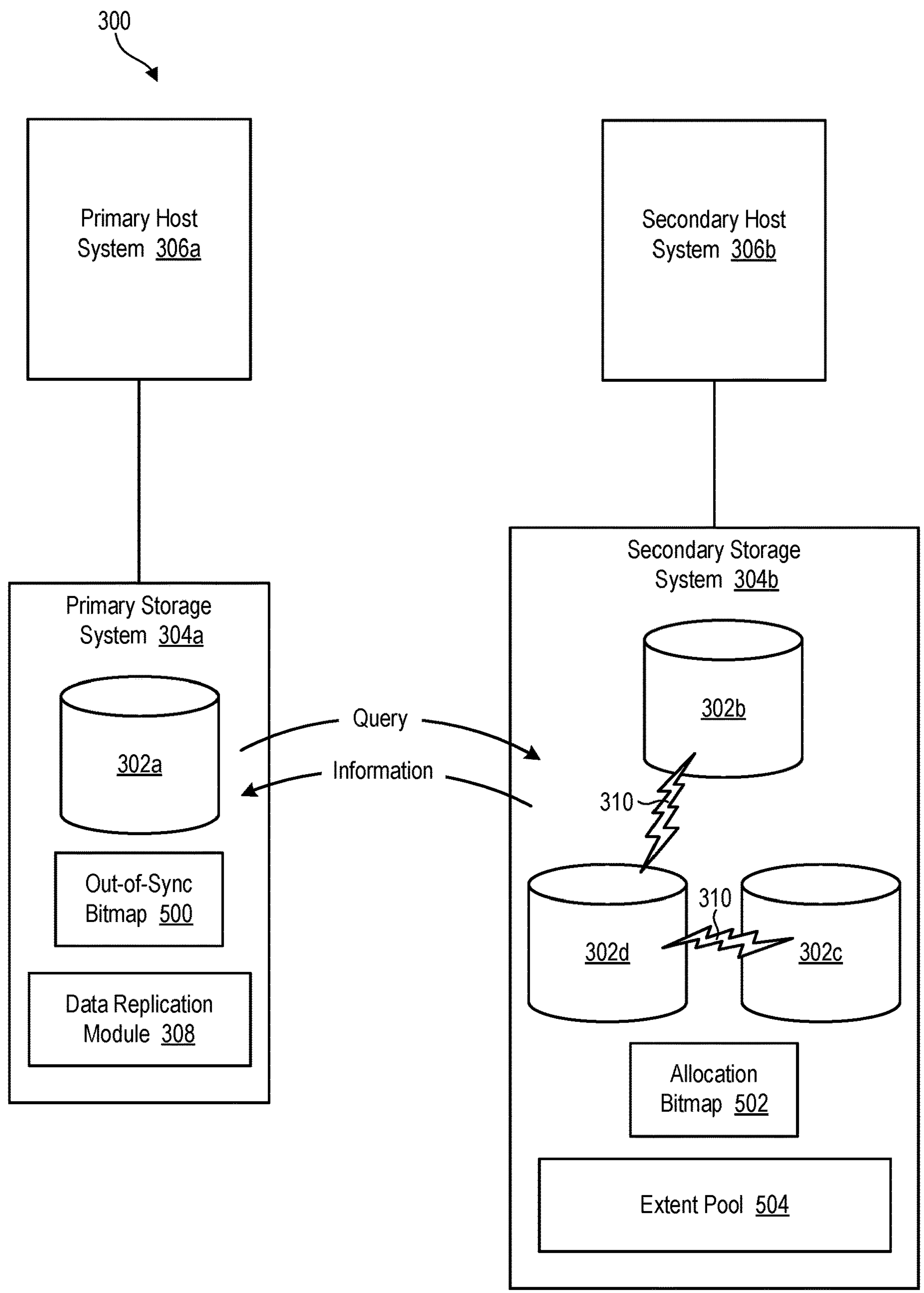
FIG. 5 is a high-level block diagram showing a technique for avoiding out-of-space conditions on a secondary storage system of an asynchronous data replication environment.

Referring to FIG. 5, frequently, in order to conserve storage capacity in Global Mirror environments, thin-provisioned volumes may be used for both journal volumes 302*c* and practice volumes 302*b* on the secondary storage system 304*b*. This is generally a good idea since storage space may be allocated on an as-need basis. However, this technique has at least one significant drawback—it may result in an out-of-space condition on the secondary storage system 304*b*, which may cause all data mirroring and writes to volumes on the secondary storage system 304*b* to fail. The most common way to recover from such an event is to delete point-in-time-copy relationships 310 (e.g., FlashCopy® relationships) on the secondary storage system 304*b*, such as in the journal volume 302*c* and/or practice volumes 302*b*. This may cause all storage space associated with point-in-time-copy target volumes 302*b*, 302*c* to be freed but also lose the consistency groups stored therein. Thus, systems and methods are needed to more effectively handle or prevent out-of-space conditions on secondary storage systems 304*b* of asynchronous data replication environments 300. Further needed are systems and methods to establish actions and/or policies to be implemented in the event out-of-space conditions occur.

FIG. 5 shows one embodiment of a technique for avoiding out-of-space conditions on a secondary storage system 304*b* of an asynchronous data replication environment 300 such as Global Mirror. When Global Mirror forms a consistency group on the primary storage system 304*a*, a line is drawn in the sand. At that point, an out-of-sync bitmap 500 on the primary storage system 304*a* documents which storage elements (e.g., tracks) on the primary volume 302*a* need to be copied to the secondary storage system 304*b* in order to mirror the consistency group to the secondary storage system 304*b*.

In order to avoid an out-of-space condition on the secondary storage system 304*b* caused by copying the consistency group to the secondary storage system 304*b*, additional functionality may be added to the primary storage system 304*a* and/or secondary storage system 304*b*. For example, prior to copying the consistency group to the secondary storage system 304*b*, the primary storage system 304*a* may be configured to query the secondary storage system 304*b* for various types of information, as shown in FIG. 5. This information may include, for example, a pool identifier identifying an extent pool 504 on the secondary storage system 304*b*, an extent size of the extent pool 504, and free capacity of the extent pool 504. The information may also include allocation bitmaps for journal volumes 302*c* associated with the extent pool 504. These allocation bitmaps may indicate which extents from the extent pool 504 are currently allocated to the journal volumes 302*c*.

Using the information gathered from the secondary storage system 304*b*, as well as information in the out-of-sync bitmap 500, the primary storage system 304*a* may calculate a number of extents that will be needed on the secondary storage system 304*b* to accommodate the consistency group. This number may be compared against a number of free extents that are available on the secondary storage system 304*b* to determine if an out-of-space condition will occur by copying the consistency group from the primary storage system 304*a* to the secondary storage system 304*b*.

Before the consistency group (as indicated in the out-of-sync bitmap 500) is copied from the primary storage system 304*a* to the secondary storage system 304*b*, the primary storage system 304*a* may acquire the out-of-sync bitmap 500, which indicates the storage elements in the primary volume 302*a* that need to be copied to the secondary storage system 304*b*, and the allocation bitmap 502, which indicates extents that are already allocated to the journal volume 302*c* associated with the primary volume 302*a*. Some conversion of the out-of-sync bitmap 500 and/or allocation bitmap 502 may be needed since the out-of-sync bitmap 500 may list storage elements (e.g., tracks) and the allocation bitmap 502 may list extents, which may be larger than the storage elements. The out-of-sync bitmap 500 may then be ORed with the allocation bitmap 502 to determine how many additional extents will be needed to accommodate, on the secondary storage system 304*b*, the consistency group from the primary storage system 304*a*.

In the event the number of extents that are needed to accommodate the consistency group on the secondary storage system 304*b* is greater than the number of free extents on the secondary storage system 304*b*, various actions may be taken. In certain embodiments, various policies may be established in advance to indicate which actions should be taken in response to an out-of-space condition or an impending out-of-space condition on the secondary storage system 304*b*.

For example, in certain embodiments, a designated policy may specify that a secondary storage system 304*b* should free all storage space associated with one or more practice copies in the event an out-of-space condition will occur. In certain embodiments, a option may be provided to do this only if the practice copies have not been modified. In other embodiments, a designated policy may specify that a secondary storage system 304*b* should free storage space from journal volumes 302*c* in response to an impending out-of-space condition. This may result in no recovery point and cause the asynchronous data replication system 300 to remain in Global Copy mode until a consistency group can be formed on the secondary storage system 304*b* without running out of space. If free space allows, practice copies may be refreshed with the last recovery point before freeing storage space in journal volumes 302*c* and switching to Global Copy. This policy may be useful for users that fully allocate practice copies and only thinly allocate journal volumes 302*c*. In other embodiments, a policy may be established to simply notify a user in response to a potential out-of-space condition, thereby enabling the user to take desired action.

Asynchronous data replication environments such as Global Mirror may ensure consistency across multiple volumes. In certain cases, a user may have knowledge regarding the criticality or priority of certain volumes. This information may, in certain embodiments, be reflected in established policies so that storage space in some volumes may be freed before others if needed.

Figure 6:
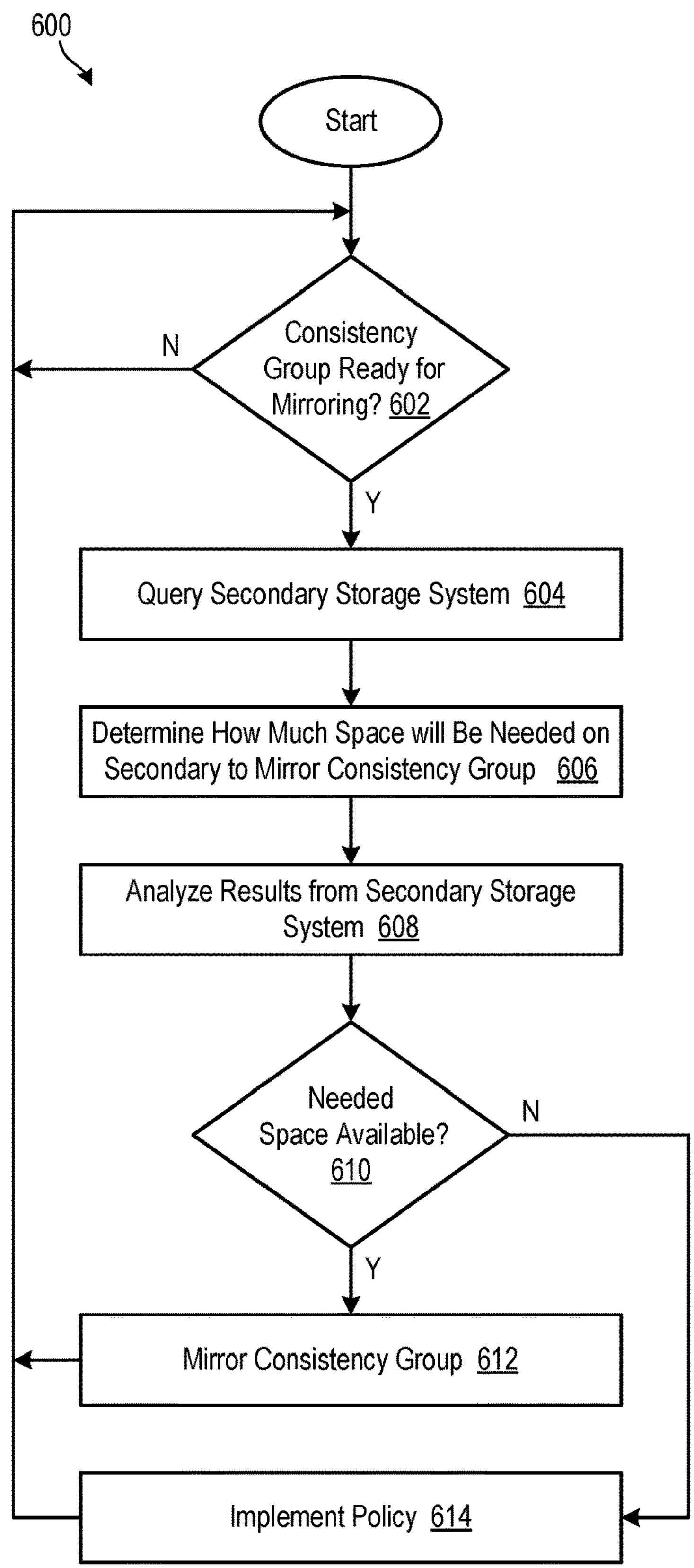
FIG. 6 is a flow diagram showing one embodiment of a method for avoiding out-of-space conditions on a secondary storage system of an asynchronous data replication environment.

Referring to FIG. 6, one embodiment of a method 600 for avoiding an out-of-space condition on a secondary storage system 304*b* is illustrated. As shown, the method 600 initially determines whether a consistency group is ready to be mirrored from a primary storage system 304*a* to a secondary storage system 304*b* in an asynchronous data replication environment 300. If so, the primary storage system 304*a* queries 604 the secondary storage system 304*b* for various types of information. This information may include, for example, a pool identifier identifying an extent pool 504 on the secondary storage system 304*b*, an extent size of the extent pool 504, a free capacity of the extent pool 504, and/or allocation bitmaps 502 indicating which extents from the extent pool 504 are currently allocated to journal volumes 302*c*.

Using information such as the out-of-sync bitmap 500 on the primary storage system 304*a*, the primary storage system 304*a* may determine 606 how much storage space will be needed on the secondary storage system 304*b* to accommodate the consistency group. The primary storage system 304*a* may also analyze 608 the information from the secondary storage system 304*b* to determine how much storage space is available or will be available on the secondary storage system 304*b* to accommodate the consistency group.

If, at step 610, sufficient storage space is available to accommodate the consistency group on the secondary storage system 304*b*, the primary storage system 304*a* mirrors 612 the consistency group from the primary storage system 304*a* to the secondary storage system 304*b*. If not enough storage space is available to accommodate the consistency group on the secondary storage system 304*b*, one or more policies may be implemented to free up storage space on the secondary storage system 304*b*, such as those discussed in association with FIG. 5.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for avoiding out-of-space conditions on a secondary storage system of an asynchronous data replication environment, the method comprising;

creating a consistency group on a primary storage system of an asynchronous data replication system;

determining a number of additional extents that will be needed on a secondary storage system to transfer data associated with the consistency group from the primary storage system to the secondary storage system;

querying, by the primary storage system, the secondary storage system to determine a number of free extents that are available on the secondary storage system;

comparing the number of additional extents to the number of free extents;

in the event the number of additional extents does not exceed the number of free extents, transferring the data from the primary storage system to the secondary storage system; and in the event the number of additional extents exceeds the number of free extents, automatically taking actions on the secondary storage system to provide the number of additional extents on the secondary storage system.

2. The method of claim 1, wherein determining a number of additional extents comprises analyzing, on the primary storage system, an out-of-sync bitmap to determine the number of additional extents.

3. The method of claim 2, wherein querying the secondary storage system comprises querying the secondary storage system for allocation bitmaps for volumes on the secondary storage system.

4. The method of claim 2, wherein querying the secondary storage system comprises querying the secondary storage system for a list of free extents in a free extent pool of the secondary storage system.

5. The method of claim 1, wherein automatically taking actions comprises freeing extents associated with practice copies on the secondary storage system.

6. The method of claim 1, wherein automatically taking actions comprises freeing extents associated with journal volumes on the secondary storage system.

7. The method of claim 1, wherein automatically taking actions comprises notifying a user of an impending out-of-space condition on the secondary storage system.

8. A computer program product for avoiding out-of-space conditions on a secondary storage system of an asynchronous data replication environment, the computer program product comprising a non-transitory computer-readable storage medium having computer-usable program code embodied therein, the computer-usable program code configured to perform the following when executed by at least one processor:

create a consistency group on a primary storage system of an asynchronous data replication system;

determine a number of additional extents that will be needed on a secondary storage system to transfer data associated with the consistency group from the primary storage system to the secondary storage system;

query, by the primary storage system, the secondary storage system to determine a number of free extents that are available on the secondary storage system;

compare the number of additional extents to the number of free extents;

in the event the number of additional extents does not exceed the number of free extents, transfer the data from the primary storage system to the secondary storage system; and in the event the number of additional extents exceeds the number of free extents, automatically take actions on the secondary storage system to provide the number of additional extents on the secondary storage system.

9. The computer program product of claim 8, wherein the computer-usable program code is further configured to analyze an out-of-sync bitmap on the primary storage system to determine the number of additional extents.

10. The computer program product of claim 9, wherein querying the secondary storage system comprises querying the secondary storage system for allocation bitmaps for volumes on the secondary storage system.

11. The computer program product of claim 9, wherein querying the secondary storage system comprises querying the secondary storage system for a list of free extents in a free extent pool of the secondary storage system.

12. The computer program product of claim 8, wherein automatically taking actions comprises freeing extents associated with practice copies on the secondary storage system.

13. The computer program product of claim 8, wherein automatically taking actions comprises freeing extents associated with journal volumes on the secondary storage system.

14. The computer program product of claim 8, wherein automatically taking actions comprises notifying a user of an impending out-of-space condition on the secondary storage system.

15. A system for avoiding out-of-space conditions on a secondary storage system of an asynchronous data replication environment, the system comprising:

at least one processor;

at least one memory device operably coupled to the at least one processor and storing instructions for execution on the at least one processor, the instructions causing the at least one processor to:

create a consistency group on a primary storage system of an asynchronous data replication system;

determine a number of additional extents that will be needed on a secondary storage system to transfer data associated with the consistency group from the primary storage system to the secondary storage system;

query, by the primary storage system, the secondary storage system to determine a number of free extents that are available on the secondary storage system;

compare the number of additional extents to the number of free extents;

in the event the number of additional extents does not exceed the number of free extents, transfer the data from the primary storage system to the secondary storage system; and in the event the number of additional extents exceeds the number of free extents, automatically take actions on the secondary storage system to provide the number of additional extents on the secondary storage system.

16. The system of claim 15, wherein the instructions further cause the at least one processor to analyze an out-of-sync bitmap on the primary storage system to determine the number of additional extents.

17. The system of claim 16, wherein querying the secondary storage system comprises querying the secondary storage system for allocation bitmaps for volumes on the secondary storage system.

18. The system of claim 16, wherein querying the secondary storage system comprises querying the secondary storage system for a list of free extents in a free extent pool of the secondary storage system.

19. The system of claim 15, wherein automatically taking actions comprises freeing extents associated with practice copies on the secondary storage system.

20. The system of claim 15, wherein automatically taking actions comprises freeing extents associated with journal volumes on the secondary storage system.

* * * * *